United States Patent
Grusy et al.

(10) Patent No.: US 9,235,348 B2
(45) Date of Patent: Jan. 12, 2016

(54) SYSTEM, AND METHODS FOR INITIALIZING A MEMORY SYSTEM

(75) Inventors: Ellen J. Grusy, Tucson, AZ (US); Brian D. Hatfield, Tucson, AZ (US); Kurt A. Lovrien, Tucson, AZ (US); Richard A. Ripberger, Tucson, AZ (US); Matthew Sanchez, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 551 days.

(21) Appl. No.: 12/859,751

(22) Filed: Aug. 19, 2010

(65) Prior Publication Data

US 2012/0047337 A1 Feb. 23, 2012

(51) Int. Cl.
*G06F 12/02* (2006.01)
*G06F 3/06* (2006.01)

(52) U.S. Cl.
CPC ............ *G06F 3/0632* (2013.01); *G06F 3/0604* (2013.01); *G06F 3/0689* (2013.01); *G06F 12/02* (2013.01)

(58) Field of Classification Search
CPC ....................................................... G06F 12/02
USPC ........................................................ 711/162
See application file for complete search history.

(56) References Cited

U.S. PATENT DOCUMENTS

| | | | |
|---|---|---|---|
| 6,484,186 B1 | 11/2002 | Rungta | |
| 7,203,791 B2 | 4/2007 | Lee | |
| 7,340,566 B2 | 3/2008 | Voth et al. | |
| 7,401,069 B2 | 7/2008 | Day et al. | |
| 7,743,171 B1 * | 6/2010 | Hwang et al. | 710/5 |
| 8,296,530 B1 * | 10/2012 | Prasad et al. | 711/154 |
| 2003/0158869 A1 | 8/2003 | Micka | |
| 2003/0233596 A1 * | 12/2003 | Corbin et al. | 714/5 |
| 2004/0215877 A1 * | 10/2004 | Chatterjee et al. | 711/114 |
| 2006/0136662 A1 * | 6/2006 | Forrer et al. | 711/112 |
| 2006/0282611 A1 * | 12/2006 | Brondijk et al. | 711/111 |

(Continued)

FOREIGN PATENT DOCUMENTS

| | | |
|---|---|---|
| CN | 11566924 A | 10/2009 |
| GB | 2370894 A | 7/2002 |
| JP | 10-232820 | 9/1998 |

OTHER PUBLICATIONS

IBM, "Discrete Remote Mirroring: Cost Effective Remote Mirroring with Disk Subsystem Based Incremental Instant Copies," IPCOM000131726D, Nov. 17, 2005, 3 pages.

*Primary Examiner* — Sanjiv Shah
*Assistant Examiner* — Gautam Sain
(74) *Attorney, Agent, or Firm* — Griffiths & Seaton PLLC

(57) ABSTRACT

Systems and methods for initializing a memory system are provided. One system includes a processor and a memory including a storage volume coupled to the processor. The storage volume includes a first bitmap for tracking an initialization process for the storage volume and a second bitmap for tracking a copying process for the storage volume. A method includes performing, via the processor, an initialization process for the storage volume and tracking, via the processor utilizing the first bitmap, the initialization process. The method further includes performing, via the processor, a copying process for the storage volume prior to completing the initialization process and tracking, via the processor utilizing the second bitmap, the copying process. Also provided are computer storage mediums including computer program code for performing the above method.

22 Claims, 2 Drawing Sheets

(56) References Cited

U.S. PATENT DOCUMENTS

| | | | |
|---|---|---|---|
| 2007/0174673 A1* | 7/2007 | Kawaguchi et al. | 714/6 |
| 2007/0214194 A1* | 9/2007 | Reuter | 707/204 |
| 2007/0220223 A1* | 9/2007 | Boyd et al. | 711/162 |
| 2008/0133470 A1 | 6/2008 | Day et al. | |
| 2008/0229038 A1* | 9/2008 | Kimura et al. | 711/162 |
| 2009/0132534 A1* | 5/2009 | Yao et al. | 707/8 |
| 2009/0138656 A1 | 5/2009 | Liu et al. | |
| 2010/0017573 A1* | 1/2010 | Shinozaki et al. | 711/162 |
| 2010/0332780 A1* | 12/2010 | Furuya | 711/162 |

* cited by examiner

SYSTEM, AND METHODS FOR INITIALIZING A MEMORY SYSTEM

BACKGROUND OF THE INVENTION

1. Field of the Invention

The present invention relates in general memory systems, and particularly to, systems and methods for initializing a memory system.

2. Description of the Related Art

Contemporary memory systems typically incorporate fully provisioned storage volumes or thin provisioning storage volumes. In memory systems incorporating fully provisioned storage volumes, a single bitmap is utilized to track initialization of a memory device and to track copying of data stored in the memory device to a secondary memory device after the memory device has been initialized. Specifically, a fully provisioned storage volume requires that the storage volume be completely formatted before data can be written to the storage volume. The bitmap tracks which memory tracks have been formatted during initialization. After the storage volume is completely formatted (i.e., each memory track is initialized), the bitmap essentially changes function such that the bitmap no longer tracks formatting of the storage volume, but instead, begins tracking which memory tracks have been copied (i.e. mirrored) to the secondary storage volume. Since the bitmap utilized in the fully provisioned storage volume is used to track both formatting and copying functions, the bitmap is capable of only tracking the formatting and copying functions on a per memory track basis.

In memory systems incorporating thin provisioning storage volumes, a single bitmap is also utilized to track both the initializing and the copying functions. Here, the individual memory tracks are initialized, allocated, and then released, each of which is tracked by the bitmap. The memory tracks are copied to the secondary device as data is written to the various memory tracks. In this situation, the various memory tracks often include varying statuses, which allows the bitmap to only track the formatting and copying functions on a per memory track basis.

SUMMARY OF THE INVENTION

Various embodiments provide memory systems. One memory system comprises a processor and a memory including a storage volume coupled to the processor. The storage volume comprises a first bitmap for tracking an initialization process for the storage volume and a second bitmap for tracking a copying process for the first storage volume.

Also provided are methods for initializing a memory system comprising a processor and a memory including a storage volume coupled to the processor. One method comprises performing, via the processor, an initialization process for the storage volume prior to completing the initialization process and tracking, via the processor utilizing a first bitmap, the initialization process. The method further comprises performing, via the processor, a copying process for the storage volume and tracking, via the processor utilizing a second bitmap, the copying process.

Various embodiments further provided physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for initializing a memory system comprising a processor and a memory including a storage volume coupled to the processor are also provided. One computer storage medium comprises computer program code for performing, via the processor, an initialization process for the storage volume while performing the initialization process and computer program code for tracking, via the processor utilizing a first bitmap, the initialization process. The computer storage medium further comprises computer program code for performing, via the processor, a copying process for the first storage volume prior to completing the initialization process and computer program code for tracking, via the processor utilizing a second bitmap, the copying process.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide systems and methods for initializing a memory system. Also, provided are computer program products for implementing and executing the systems and methods for initializing the memory system.

Figure 1:
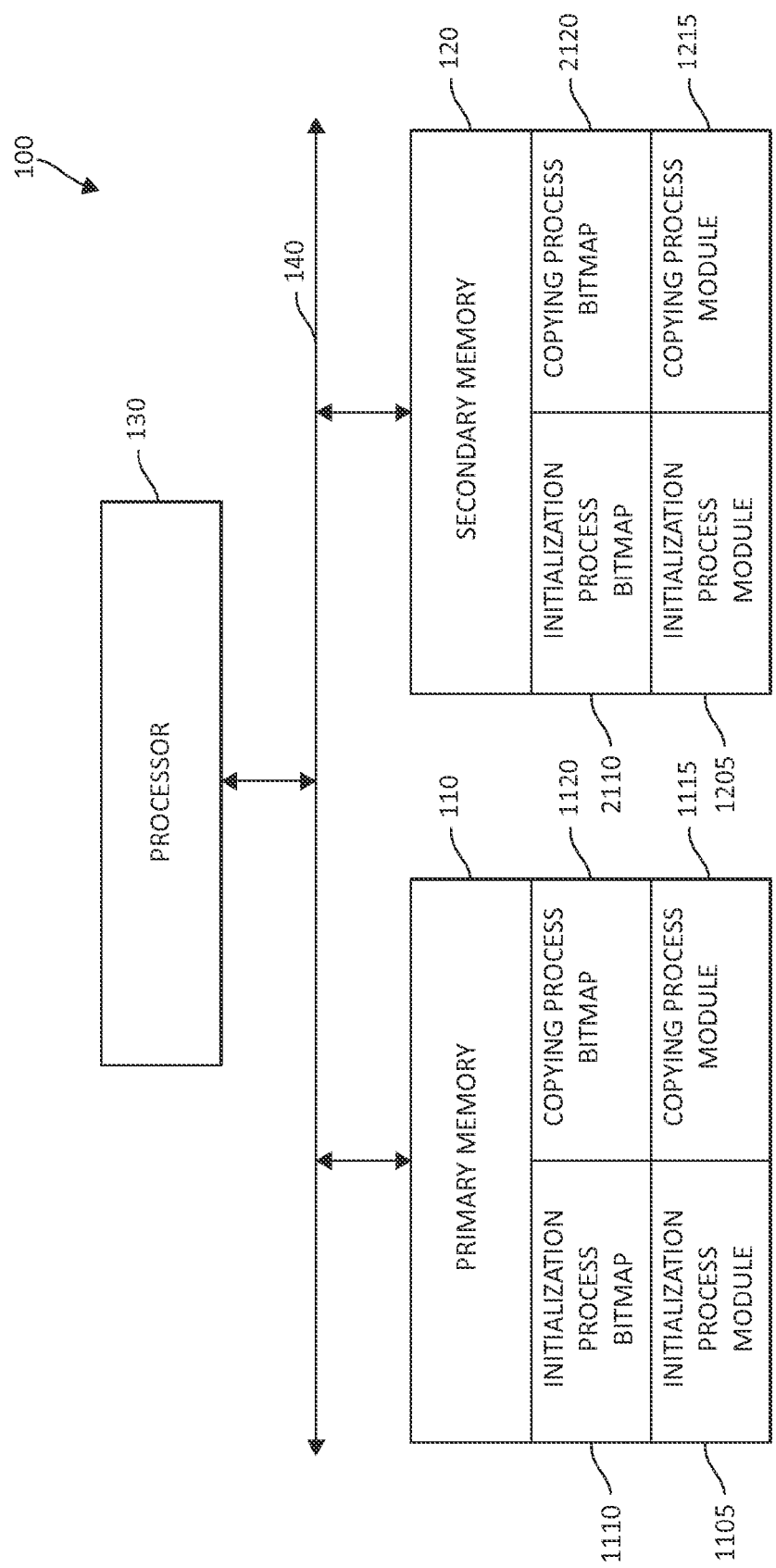
FIG. 1 is a block diagram of one embodiment of a memory system comprising a primary memory device including a first bitmap for tracking an initialization process on a per stripe basis or on a per plurality of full stripes basis and a second bitmap for tracking a copying process on a per stripe basis or on a per track basis.

Turning now to the figures, FIG. 1 is a block diagram of a memory system 100. At least in the illustrated embodiment, memory system 100 comprises a primary memory 110 coupled to a secondary memory 120 and a processor 130 via a bus 140 (e.g., a wired and/or wireless bus).

Primary memory 110 may be configured as either a fully provisioned storage volume or as a thin provisioning storage volume implemented on any known storage medium (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) and/or a storage medium developed in the future. Primary memory 110, in various embodiments, comprises a module 1105 for performing a process to initialize primary memory 110, an initialization process bitmap 1110, a module 1115 for performing a copying/mirroring process to secondary memory 120, and a copying process bitmap 1120 configured to track the copying/mirroring process.

In one embodiment, the module 1105 for initializing primary memory 110 is performed on a per full stripe basis. In this embodiment, primary memory 110 initializes whole stripes and does not initialize partial stripes. In another embodiment, the module 1105 for initializing primary memory 110 is performed on a per plurality of full stripes basis. In this embodiment, primary memory 110 initializes whole stripes and does not initialize partial stripes. In addition, because primary memory 110 initializes whole stripes and does not initialize partial stripes, primary memory 110 avoids the write penalty experienced in some redundant array of independent disk (RAID) configurations that write fractional stripes.

Since the metadata for initialization processes that are performed on the per stripe basis or the per plurality of full stripes basis is smaller than the metadata for initialization processes that are performed on a per track basis, initialization processes that are performed on the per stripe basis or on the per plurality of full stripes basis are faster than initialization processes that are performed on a per track basis. In addition, with a smaller amount of metadata, initialization processes that are performed on the per stripe basis require fewer updates and a smaller amount of storage space.

Initialization process bitmap 1110 is configured to track the initialization process performed on primary memory 110. That is, initialization process bitmap 1110 is configured to track the initialization process on a per stripe basis or on a per plurality of stripes basis. Specifically, initialization process bitmap 1110 is configured to track, stripe-by-stripe or plurality of stripes-by-plurality of stripes, the initialization process of primary memory 110.

The module 1115 for performing the copying/mirroring process is configured to copy (or mirror) the data stored in primary memory 110 to secondary memory 120. In one embodiment, the copying/mirroring process is a synchronous copying/mirroring process. In another embodiment, the copying/mirroring process is an asynchronous copying/mirroring process.

Copying process bitmap 1120 is configured to track the copying/mirroring process performed on primary memory 110. That is, copying process bitmap 1120 is configured to track the copying/mirroring process on a per memory track basis or on a per stripe basis. Specifically, copying process bitmap 1120 is configured to track which data has been copied/mirrored to secondary memory 120 from primary memory as each memory track or each stripe is copied/mirrored.

Since memory system 100 includes both initialization process bitmap 1110 and copying process bitmap 1120, memory system 100 is capable of initializing primary memory 110 and tracking the initialization process on a per stripe basis or on a plurality of full stripes basis. Furthermore, because memory system 100 includes both initialization process bitmap 1110 and copying process bitmap 1120, memory system 100 is capable of copying/mirroring data stored primary memory 110 and tracking the copying process on a per stripe basis or a per track basis. In addition, because memory system 100 includes both initialization process bitmap 1110 and copying process bitmap 1120, memory system 100 is capable of initializing primary memory 110 and copying data from primary memory 110 to secondary memory 120 at substantially the same time.

Secondary memory 120 may be configured as either a fully provisioned storage volume or as a thin provisioning storage volume implemented on any known storage medium (e.g., an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing) and/or a storage medium developed in the future. In various embodiments, secondary memory 120 is configured to mirror the data stored in primary memory 110 such that secondary memory 120 stores a redundant copy of the data stored in primary memory 110.

In other embodiments, secondary memory 120 is configured similar to primary memory 110 such that secondary memory 120 operates similar to primary memory 110. That is, secondary memory 120 may comprise a module 1205 for performing a process to initialize secondary memory 120, an initialization process bitmap 1210, a module 1215 for performing a copying/mirroring process to primary memory 110, and a copying process bitmap 1220 configured to track the copying/mirroring process similar to the module 1105 for performing the process to initialize primary memory 110, initialization process bitmap 1110, the module 1115 for performing the copying/mirroring process to secondary memory 120, and copying process bitmap 1120, respectively.

Processor 130, in various embodiments, is configured to perform the initialization process for primary memory 110 (i.e., execute module 1105 and/or 1205). The initialization process, in one embodiment, is a fully provisioned initialization process. In another embodiment, the initialization process is a thin provisioning initialization process.

Processor 130 is further configured to track the initialization process utilizing initialization bitmap 1110. Processor 130 is configured to establish a copying relationship between a portion of the memory tracks or stripes in primary memory 110 and a portion of the memory tracks or stripes in secondary memory 120 prior to completion of the initialization process. In other words, processor 130 is capable of establishing a copy relationship between a portion of the memory tracks or stripes in primary memory 110 and a portion of the memory tracks or stripes in secondary memory 120 without needing to wait for completion of the initialization process. Furthermore, because processor 130 is capable of establishing a copy relationship between the portion of the memory tracks or stripes in primary memory 110 and the portion of the memory tracks or stripes in secondary memory 120 without needing to wait for completion of the initialization process, a separate background process to initialize the stripes in primary memory 110 and/or secondary memory 120 is not required. That is, the various stripes in primary memory 110 and/or secondary memory 120 are capable of being initialized on an "as needed" basis since memory system 100 includes a dedicated initialization process bitmap (i.e., initialization process bitmap 1110) and a dedicated copying process bitmap (i.e., copying process bitmap 1120). In other words, memory system 100 is not required to wait until all of the stripes in primary memory 110 are initialized prior to beginning the copying process.

Furthermore, processor 130 is configured to perform a copying/mirroring process for primary memory 110 (i.e., execute module 1115 and/or module 1215). In one embodiment, the data stored in each memory track of primary memory 110 is copied/mirrored to secondary memory 120 on a per memory track basis. In another embodiment, the data stored in each stripe of primary memory 110 is copied/mirrored to secondary memory 120 on a per stripe basis. In addition, processor 130 is configured to synchronously or asynchronously copy/mirror the data primary memory 110 to secondary memory 120.

Processor 130 is further configured to track the copying/mirroring process utilizing copying process bitmap 1120. That is, processor 130 is configured to use copying process bitmap 1120 to synchronously or asynchronously track each memory track or stripe as it is copied from primary memory 110 to secondary memory 120.

The copying/mirroring process (or any other process (e.g., a process from a host computing device)) may access a track or a stripe via either a write request or a read request. In one embodiment, when there is a write request by the copying/mirroring process (or any other process (e.g., a process from a host computing device)) to a stripe that has not yet been initialized, the initialization data is merged into the write request to primary memory 110 or secondary memory 120 so that full stripe writes are performed. In other words, the write request includes the write data provided by the copying/mirroring process (or other process) and adds initialization data for any portion of the stripe that is not included in the write data.

When there is a read request by the copying/mirroring process (or any other process (e.g., a process from a host computing device)) to a stripe that has not been initialized, the initialization data is provided to the process that initiated the read request. In one embodiment, processor 120 provides the initialization data to the process that initiated the read request instead of initializing the storage volume and reading (or staging) the initialization data.

Figure 2:
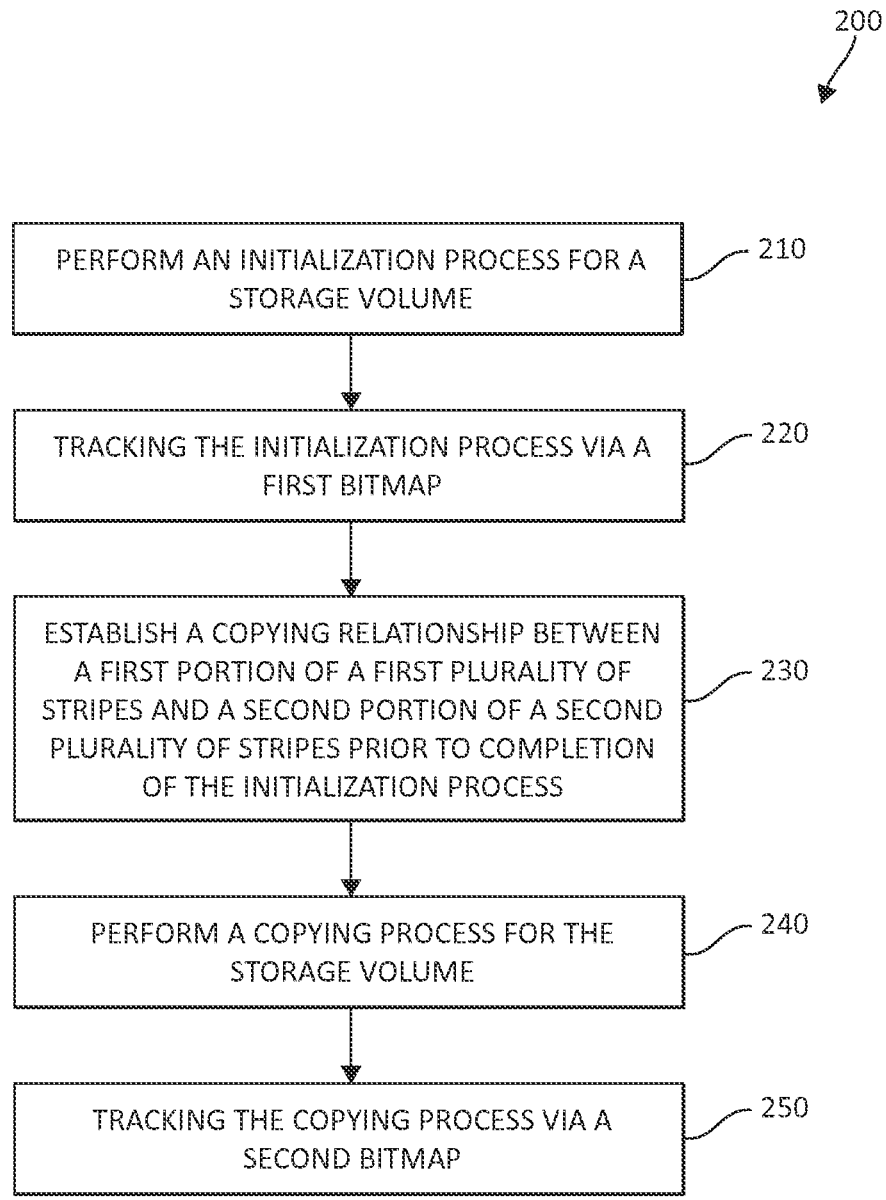
FIG. 2 is a flow diagram of one embodiment of a method for initializing a memory system.

Turning now to FIG. 2, FIG. 2 is a flow diagram of one embodiment of a method 200 for initializing a memory system (e.g., memory system 100). At least in the illustrated embodiment, method 200 begins by performing an initialization process for a primary memory (e.g., primary memory 110) (block 210). The initialization process, in one embodiment, is a fully provisioned initialization process. In another embodiment, the initialization process is a thin provisioning initialization process.

In one embodiment, the initialization process is performed on a per full stripe basis. In another embodiment, the initialization processor is performed on a plurality of full stripes basis.

Method 200 also comprises tracking the initialization process utilizing an initialization bitmap (e.g., initialization bitmap 1110) (block 220). Method 200 further includes establishing a copying relationship between a portion of the memory tracks or stripes in the primary memory and a portion of the memory tracks or stripes in the secondary memory prior to completion of the initialization process (block 230).

Furthermore, method 200 comprises performing a copying/mirroring process for the primary memory (block 240). In one embodiment, the primary memory is portioned into a plurality of memory tracks and the data stored in each memory track is copied/mirrored to a secondary memory (e.g., secondary memory 120) on a per memory track basis. In another embodiment, the primary memory is portioned into a plurality of stripes and the data stored in each stripe is copied/mirrored to the secondary memory on a per stripe basis. In various embodiments, the data may be synchronously or asynchronously copied/mirrored to the secondary memory.

In one embodiment, method 200 also comprises tracking utilizing a copying process bitmap (e.g., copying process bitmap 1120) (block 250). That is, the copying process bitmap synchronously or asynchronously tracks each memory track or stripe as it is copied from the primary memory to the secondary memory.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a computer-readable storage medium. A computer readable storage medium may be, for example, but not limited to, an electronic, magnetic, optical, crystal, polymer, electromagnetic, infrared, or semiconductor system, apparatus, or device, or any suitable combination of the foregoing. Examples (a non-exhaustive list) of computer-readable storage medium include the following: an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Program code embodied on a computer-readable medium may be transmitted using any appropriate medium, including but not limited to wireless, wired, optical fiber cable, radio frequency (RF), etc., or any suitable combination of the foregoing. Computer program code for carrying out operations for aspects of the present invention may be written in any static language, such as the "C" programming language or similar programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A memory system, comprising:
   a processor;
   a first memory comprising a first storage volume coupled to the processor, the first storage volume comprising:
      a first bitmap for keeping track of formatting of the first storage volume, the formatting being performed to allow data to be written to the first storage volume, and
      a second bitmap for keeping track of a copying process for the first storage volume; and
   a second memory in communication with the processor, wherein the processor:
      establishes a relationship between the first memory and the second memory, formats the first storage volume, performs the copying process,
      simultaneously and without interruption formats the first storage volume and performs the copying process by copying data from the first memory to the second memory prior to the completion of the formatting of the first storage volume while keeping track of the formatting on the first bitmap such that the first storage volume is initialized at a same time as the data is copied from the first memory to the second memory, and
      keeps track of the copying process between the first memory and the second memory on the second bitmap by:
         receiving a write request to write data to a stripe in the first storage volume prior to the stripe being formatted,
         merging formatting data for the stripe and the data in the write request so that the stripe is fully written to,
         formatting the stripe,
         tracking the formatting of the stripe on the first bitmap, and
         synchronously with tracking the formatting, writing the data to the stripe and tracking the stripe on the second bitmap, wherein
            the copying process for copying the data from the first memory to the second memory prior to the completion of the formatting of the first storage volume is a foreground process allowing for formatting stripes on an "as needed" basis.

2. The memory system of claim 1, wherein the first storage volume is partitioned into a first plurality of stripes and the first bitmap keeps track of the formatting on a per stripe basis or a plurality of full stripes basis.

3. The memory system of claim 2, wherein the second memory comprises a second storage volume coupled to the processor, wherein:
   the processor is configured to perform the formatting;
   the first plurality of stripes store data;
   the second storage volume is partitioned into a second plurality of stripes;
   the processor is configured to perform the copying process by copying the data stored in the first plurality of stripes to the second plurality of stripes prior to completing the formatting; and
   the second bitmap tracks the copying process on a per stripe basis.

4. The memory system of claim 3, wherein the processor is configured to set up a copying relationship between a first portion of the first plurality of stripes and a second portion of the second plurality of stripes prior to completion of the formatting.

5. The memory system of claim 4, wherein the first storage volume is formatted via a fully provisioning process.

6. The memory system of claim 4, wherein the first storage volume is formatted via a thin provisioning process.

7. The memory system of claim 1, wherein:
   the second memory comprises a second storage volume coupled to the processor,
      the first storage volume is partitioned into a first plurality of stripes storing data,
      the second storage volume is partitioned into a second plurality of stripes,
      the processor is configured to perform the copying process by copying the data stored in the first plurality of stripes to the second plurality of stripes, and
      the second bitmap keeps track of the copying process on a per stripe basis.

8. A method for initializing a memory system comprising a processor and a first memory including a first storage volume coupled to the processor, the method comprising:
   formatting, via the processor, the first storage volume, the formatting being performed to allow data to be written to the first storage volume;

keeping track, via the processor utilizing a first bitmap, of the formatting;

establishing a relationship between the first storage volume and a second storage volume, prior to completing the formatting of the first storage volume;

performing, via the processor, a copying process for the first storage volume to the second storage volume, wherein the processor simultaneously and without interruption formats the first storage volume and performs the copying process by copying data from the first memory to the second memory prior to completing the formatting of the first storage volume such that the first storage volume is initialized at a same time as the data is copied from the first memory to the second memory; and keeping track, via the processor utilizing a second bitmap, of the copying process between the first storage volume and the second storage volume by:

receiving, via a first process, a write request to write data to a stripe in the first storage volume prior to the stripe being formatted, merging formatting data for the stripe and the data in the write request so that the stripe is fully written to, formatting the stripe, tracking the formatting of the stripe on the first bitmap, and synchronously with tracking the formatting, writing the data to the stripe and tracking the stripe on the second bitmap, wherein the copying process for copying the data from the first memory to the second memory prior to the completion of the formatting of the first storage volume is a foreground process allowing for formatting stripes on an "as needed" basis.

9. The method of claim 8, wherein the first storage volume is partitioned into a first plurality of stripes and wherein:

formatting comprises formatting the first storage volume on a per stripe basis or a plurality of full stripes basis; and keeping track of the formatting comprises keeping track of the formatting on the per stripe basis or the per plurality of full stripes basis.

10. The method of claim 9, wherein the memory system comprises a second memory comprising the second storage volume coupled to the processor, the first plurality of stripes store data, and the second storage volume is partitioned into a second plurality of stripes, and wherein:

performing the copying process comprises copying the data stored in the first plurality of stripes to the second plurality of stripes on a per stripe basis or a per track basis; and keeping track of the copying process comprises keeping track of the copying process on the per stripe basis.

11. The method of claim 10, further comprising setting up a copying relationship between a first portion of the first plurality of stripes and a second portion of the second plurality of stripes prior to completion of the formatting.

12. The method of claim 11, wherein formatting comprises performing a fully provisioned formatting.

13. The method of claim 11, wherein formatting comprises performing a thin provisioning formatting.

14. The method of claim 8, wherein the memory system comprises a second memory comprising the second storage volume coupled to the processor, the first plurality of stripes store data, and the second storage volume is partitioned into a second plurality of stripes, and wherein:

performing the copying process comprises copying the data stored in the first plurality of stripes to the second plurality of stripes on a per stripe basis or a per track basis; and keeping track of the copying process comprises keeping track of the copying process on the per stripe basis.

15. The method of claim 8, further comprising:

receiving, from a second process, a read request to read data from a track or a stripe in the first storage volume prior to the stripe being formatted;

providing formatting data for the track or the stripe to the second process; and reading, by the second process, the formatting data.

16. The method of claim 8, further comprising:

receiving, from a process, a read request to read data from a stripe in the first storage volume prior to the stripe being formatted;

providing formatting data for the stripe to the process; and reading, by the process, the formatting data.

17. A non-transitory computer storage medium comprising a computer program product method for formatting a memory system comprising a processor and a first memory including a first storage volume coupled to the processor, the non-transitory computer storage medium comprising:

computer program code for formatting, via the processor, the first storage volume, the formatting being performed to allow data to be written to the first storage volume;

computer program code for keeping track, via the processor utilizing a first bitmap, of the formatting;

computer program code for establishing a relationship between the first storage volume and a second storage volume, prior to completing the formatting of the first storage volume; and computer program code for performing, via the processor, a copying process for the first storage volume to the second storage volume, wherein the processor simultaneously and without interruption formats the first storage volume and performs the copying process by copying data from the first memory to the second memory prior to completing the formatting of the first storage volume such that the first storage volume is initialized at a same time as the data is copied from the first memory to the second memory; and computer code for keeping track, via the processor utilizing a second bitmap, of the copying process between the first storage volume and the second storage volume by:

receiving a write request to write data to a stripe in the first storage volume prior to the stripe being formatted, merging formatting data for the stripe and the data in the write request so that the stripe is fully written to, formatting the stripe, tracking the formatting of the stripe on the first bitmap, and synchronously with tracking the formatting, writing the data to the stripe and tracking the stripe on the second bitmap, wherein the copying process for copying the data from the first memory to the second memory prior to the completion of the formatting of the first storage volume is a foreground process allowing for formatting tracks or stripes on an "as needed" basis.

18. The non-transitory computer storage medium of claim 17, wherein the first storage volume is partitioned into a first plurality of stripes and wherein:

the computer program code for formatting comprises computer program code for formatting the first storage volume on a per stripe basis or a plurality of full stripes basis; and the computer program code for keeping track of the formatting comprises computer program code for keeping track of the formatting on the per stripe basis or the plurality of full stripes basis.

19. The non-transitory computer storage medium of claim 18, wherein the memory system comprises a second memory comprising the second storage volume coupled to the processor, the first plurality of stripes store data, and the second storage volume is partitioned into a second plurality of stripes, and wherein:

the computer program code for performing the copying process comprises computer program code for copying the data stored in the first plurality of stripes to the second plurality of stripes on a per stripe basis or a per track basis; and the computer program code for keeping track of the copying process comprises computer program code for keeping track of the copying process on the per stripe basis.

20. The non-transitory computer storage medium of claim 19, further comprising computer program code for setting up a copying relationship between a first portion of the first plurality of stripes and a second portion of the second plurality of stripes prior to completion of the formatting.

21. The non-transitory computer storage medium of claim 20, wherein the computer program code for formatting comprises one of computer program code for performing a fully provisioned formatting and computer program code for performing a thin provisioning formatting.

22. The non-transitory computer storage medium of claim 17, wherein the memory system comprises a second memory comprising the second storage volume coupled to the processor, the first plurality of stripes store data, and the second storage volume is partitioned into a second plurality of stripes, and wherein:

the computer program code for performing the copying process comprises computer program code for copying the data stored in the first plurality of stripes to the second plurality of stripes on a per stripe basis or a per track basis; and the computer program code for tracking the copying process comprises computer program code for keeping track of the copying process on the per stripe basis.

\* \* \* \* \*